(12) United States Patent
Hotta et al.

(10) Patent No.: US 9,400,342 B2
(45) Date of Patent: Jul. 26, 2016

(54) DETECTION APPARATUS

(71) Applicant: FUJI XEROX CO., LTD., Minato-ku, Tokyo (JP)

(72) Inventors: Hiroyuki Hotta, Kanagawa (JP); Hideo Nakayama, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 155 days.

(21) Appl. No.: 13/870,418

(22) Filed: Apr. 25, 2013

(65) Prior Publication Data

US 2014/0097334 A1   Apr. 10, 2014

(30) Foreign Application Priority Data

Oct. 9, 2012   (JP) .................................. 2012-224300

(51) Int. Cl.
*G01V 8/20* (2006.01)

(52) U.S. Cl.
CPC ........................................ *G01V 8/20* (2013.01)

(58) Field of Classification Search
CPC ..... H01L 21/68; H01L 21/681; H01L 21/682; H01L 21/66781; H01L 21/67778; H01L 21/67748; H01L 21/67742; H01L 21/67745; H01L 21/67259; G01V 8/20; G01V 8/12; G01N 21/8851; G02B 21/0016; G01B 7/04; G01B 7/042; G01B 7/048; G01B 11/04; G01B 11/043; G01B 11/046; G01B 11/24; G01B 11/2433; G01B 11/245; G01B 11/306; G01B 11/026; G01B 11/14; G01B 11/303; G01P 3/36; G01P 3/68; G06F 3/0325; G01S 17/026; A24C 5/3412; B07C 5/342; B07C 5/126; G01M 11/3145; G01J 5/20; G01J 5/08; G01J 5/10; G01J 5/34; B65G 47/086; B65G 47/08; B65H 33/16; G08B 13/1895; G08B 13/19; G08B 13/193; G08B 13/191

USPC ........... 250/221, 221.1, 223 R, 223 B, 338.1, 250/338.3, 339.02; 356/73.1, 28, 27, 612, 356/614, 237.2–237.5; 414/901, 902, 938, 414/939

See application file for complete search history.

(56) References Cited

U.S. PATENT DOCUMENTS 3,598,978 A * 8/1971 Rempert .......................... 700/59
5,614,710 A * 3/1997 Mondie et al. ............. 250/223 R
(Continued)

FOREIGN PATENT DOCUMENTS

JP          55-7613 A    1/1980
JP          57-114861 A  7/1982
(Continued)

OTHER PUBLICATIONS

Communication dated Feb. 9, 2016 from the Japanese Patent Office issued in corresponding Application No. 2012-224300.

*Primary Examiner* — Renee D Chavez
(74) *Attorney, Agent, or Firm* — Sughrue Mion, PLLC

(57) ABSTRACT

A detection apparatus includes: plural light emitting sections that are disposed in a row and that emit parallel light to a passage region, over which an object passes, in a time-staggered manner; one or more light receiving sections that receive the parallel light reflected by or having transmitted through the object, a number of the light receiving sections being less than a number of the light emitting sections; and a detection section that detects at least one of edges of the object and edges of a portion of the object with a different reflectivity or transmittance in accordance with an intensity distribution of the parallel light received by the light receiving sections.

23 Claims, 11 Drawing Sheets

(56) References Cited

U.S. PATENT DOCUMENTS

| | | | |
|---|---|---|---|
| 7,684,057 B2* | 3/2010 | Sakai | G01B 11/022 356/614 |
| 2008/0121788 A1* | 5/2008 | Kawada | 250/231.13 |
| 2008/0204704 A1* | 8/2008 | Rankin et al. | 356/28 |
| 2010/0230242 A1* | 9/2010 | Basu et al. | 198/502.2 |
| 2010/0260378 A1* | 10/2010 | Noy et al. | 382/103 |
| 2013/0301040 A1* | 11/2013 | Ahner et al. | 356/237.2 |

FOREIGN PATENT DOCUMENTS

| | | |
|---|---|---|
| JP | 60-233504 A | 11/1985 |
| JP | 62-267685 A | 11/1987 |
| JP | 4-70711 A | 3/1992 |
| JP | 6-109448 A | 4/1994 |
| JP | 07-198338 A | 8/1995 |
| JP | 10-318726 A | 12/1998 |
| JP | 2006-337078 A | 12/2006 |

* cited by examiner

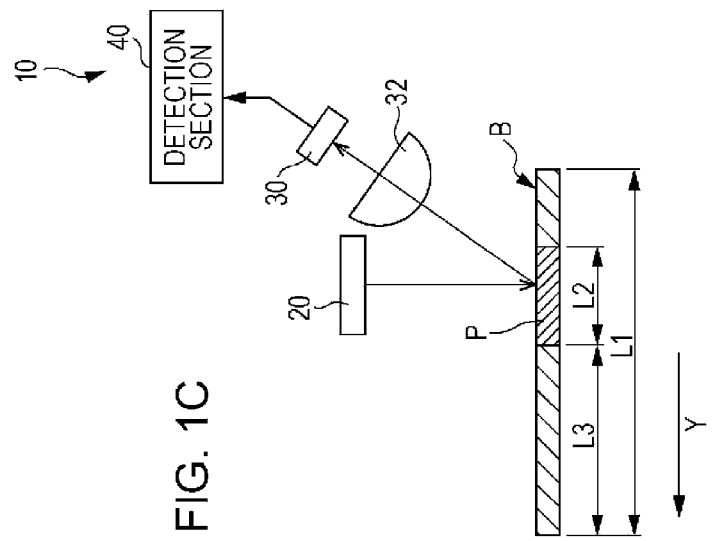
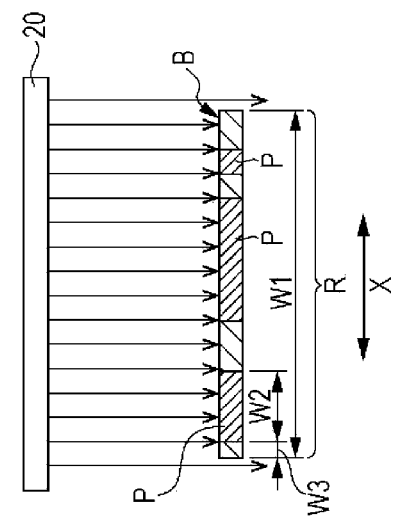
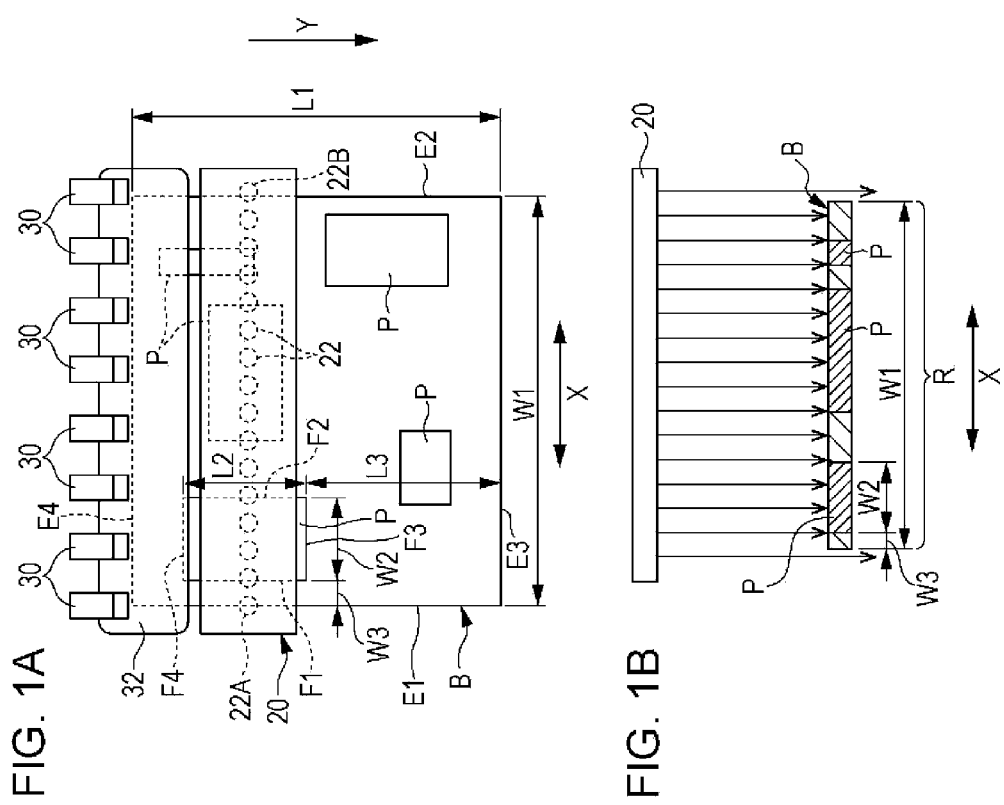
FIG. 1A
FIG. 1B
FIG. 1C

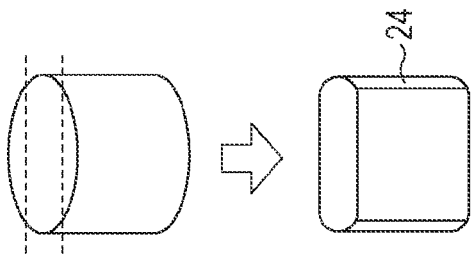
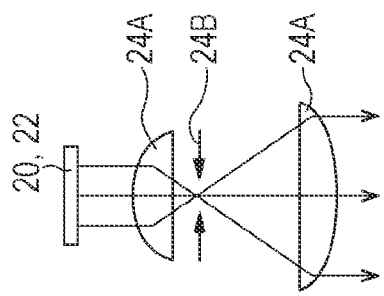
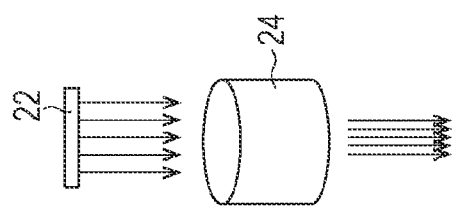
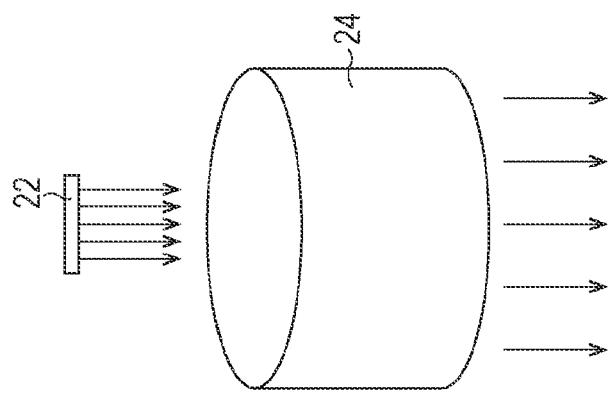

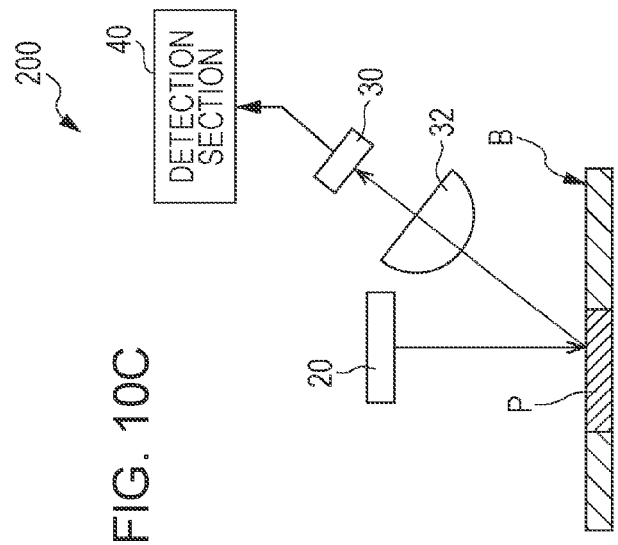
FIG. 10C
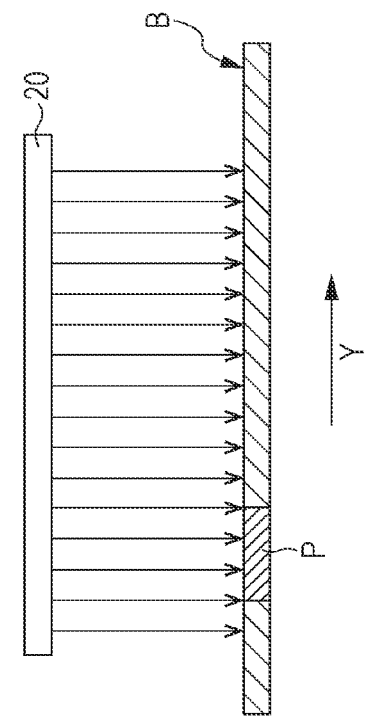
FIG. 10A
FIG. 10B

US 9,400,342 B2

DETECTION APPARATUS

CROSS-REFERENCE TO RELATED APPLICATIONS

This application is based on and claims priority under 35 USC 119 from Japanese Patent Application No. 2012-224300 filed Oct. 9, 2012.

BACKGROUND

Technical Field

The present invention relates to a detection apparatus.

SUMMARY

According to an aspect of the present invention, there is provided a detection apparatus including: plural light emitting sections that are disposed in a row and that emit parallel light to a passage region, over which an object passes, in a time-staggered manner; one or more light receiving sections that receive the parallel light reflected by or having transmitted through the object, a number of the light receiving sections being less than a number of the light emitting sections; and a detection section that detects at least one of edges of the object and edges of a portion of the object with a different reflectivity or transmittance in accordance with an intensity distribution of the parallel light received by the light receiving sections.

BRIEF DESCRIPTION OF THE DRAWINGS

Exemplary embodiments of the present invention will be described in detail based on the following figures, wherein:

FIG. 1A is a plan view of a detection apparatus according to a first exemplary embodiment, FIG. 1B is a front view of the detection apparatus according to the first exemplary embodiment, and FIG. 1C is a side view of the detection apparatus according to the first exemplary embodiment;

FIGS. 3A to 3D are each a schematic view showing a configuration that uses an optical element that increases or decreases the interval between rays of parallel light from semiconductor lasers according to the first exemplary embodiment while maintaining the light as parallel light;

FIG. 10A is a plan view of a detection apparatus according to a second exemplary embodiment, FIG. 10B is a front view of the detection apparatus according to the second exemplary embodiment, and FIG. 10C is a side view of the detection apparatus according to the second exemplary embodiment;

DETAILED DESCRIPTION

Figure 2A:
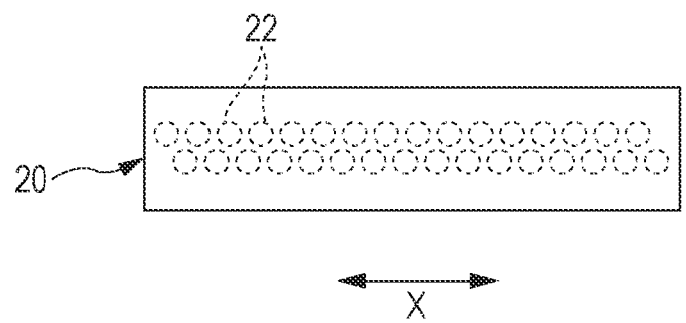
FIGS. 2A and 2B are each a plan view showing a light emitting element according to a modification of the first exemplary embodiment.

Exemplary embodiments of the present invention will be described below with reference to the drawings.

First Exemplary Embodiment

Configuration of Detection Apparatus 10 According to First Exemplary Embodiment

First, the configuration of a detection apparatus 10 according to a first exemplary embodiment will be described. FIGS. 1A to 1C are each a schematic view showing the configuration of the detection apparatus 10 according to the exemplary embodiment. As shown in FIG. 1C, the detection apparatus 10 includes a light emitting element 20 that serves as an example of light emitting portions, a light receiving element 30 that serves as an example of light receiving sections, and a detection section 40.

(Light Emitting Element 20)

As shown in FIGS. 1A and 1B, the light emitting element 20 includes semiconductor lasers 22 that serve as an example of plural (at least three or more) light emitting sections that emit parallel light to a passage region (travel region) over which an object B passes (travels). Specifically, surface emitting lasers (SELs) that emit light perpendicularly to a semiconductor substrate, more specifically vertical cavity surface emitting lasers (VCSELs) that incorporate a resonator perpendicularly to a semiconductor substrate, are used as the semiconductor lasers 22. The term "parallel light" refers to light rays with their light axes extending in parallel to each other, and the individual light rays may be diffused light rays.

Other examples of the semiconductor lasers 22 include edge emitting lasers (EELs) that incorporate a resonator in a direction along a semiconductor substrate to emit light in a direction along the semiconductor substrate from a cleaved side surface.

Unlike light emitting diodes (LEDs), the semiconductor lasers 22 have a resonator structure. The semiconductor lasers 22 resonate light through the resonator structure to form the light into parallel light and reduce the diameter of the light. That is, the resonator structure functions as a structure for forming parallel light. As a configuration for forming parallel light, an optical element such as a collimator lens may be used in place of or in addition to the resonator structure. Thus, the light emitting sections may be LEDs and optical elements such as collimator lenses.

The light emitting element 20 is formed by integrally forming the plural semiconductor lasers 22 on a common substrate (semiconductor substrate (wafer)). That is, the light emitting element 20 is formed by forming the plural semiconductor lasers 22 through a sequence of processes, rather than by assembling plural light emitting sections manufactured individually.

The plural semiconductor lasers 22 are disposed in a row along an orthogonal direction (X direction) that is orthogonal to a passage direction (travel direction) Y in which the object B passes (travels) over a passage region R. Specifically, the plural semiconductor lasers 22 are disposed in one row.

As shown in FIG. 2A, the semiconductor lasers 22 may be disposed in two rows. This reduces the interval between the semiconductor lasers 22 in the orthogonal direction X, improving the resolution. In the case where the semiconductor lasers 22 which are VCSELs are arranged in three or more rows, a wiring space is necessary between the semiconductor lasers 22, and the interval between the semiconductor lasers 22 in the orthogonal direction X is not reduced. This makes it difficult to improve the resolution compared to the case where the semiconductor lasers 22 are arranged in two rows. It should be noted, however, that the semiconductor lasers 22 may be disposed in three or more rows in order to improve the reliability of detection by increasing the number of the semiconductor lasers 22.

Figure 2B:
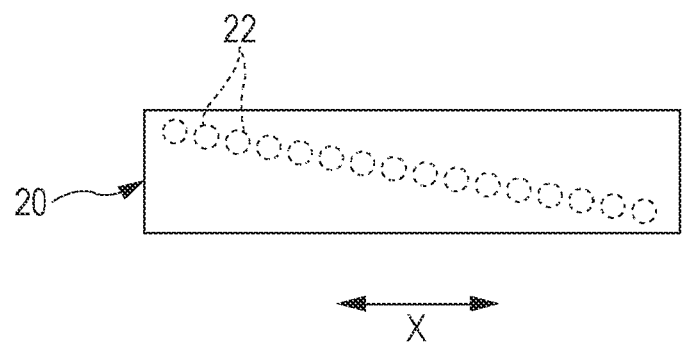

As shown in FIG. 2B, the plural semiconductor lasers 22 may be disposed obliquely with respect to the orthogonal direction X. This reduces the interval between the semiconductor lasers 22 in the orthogonal direction X, improving the resolution.

As shown in FIG. 1B, the plural semiconductor lasers 22 emit parallel light downward, and rays of the parallel light emitted from the semiconductor lasers 22 are disposed in a row along the orthogonal direction X. The beam diameter of the parallel light is 1 to 20 µm, for example, and the interval of the rays of the parallel light is 10 to 1000 µm, for example.

The plural semiconductor lasers 22 sequentially emit light. Specifically, the plural semiconductor lasers 22 emit light one by one in the order from the semiconductor laser 22A in the leftmost position in FIG. 1A (hereinafter referred to as "leftmost semiconductor laser") to the semiconductor laser 22B in the rightmost position in FIG. 1A (hereinafter referred to as "rightmost semiconductor laser"). After the rightmost semiconductor laser 22B finishes emitting light, the semiconductor lasers 22 emit light again in the order from the leftmost semiconductor laser 22A to the rightmost semiconductor laser 22B. In this way, the plural semiconductor lasers 22 repeatedly sequentially emit light in the order from the leftmost semiconductor laser 22A to the rightmost semiconductor laser 22B. That is, in the exemplary embodiment, while one of the semiconductor lasers is turned on, the other semiconductor lasers are substantially turned off. Plural semiconductor lasers that are adjacent to each other may be formed into a group of semiconductor lasers that sequentially emit light.

The semiconductor lasers 22 emit light at intervals of 1 ns, for example. Thus, for the light emitting element 20 having 1000 semiconductor lasers 22, one cycle of sequential light emission from the leftmost semiconductor laser 22A to the rightmost semiconductor laser 22B is 1 µm.

In order to compensate for variations in amount of light emitted by the semiconductor lasers 22, it is desirable that each of the semiconductor lasers 22 should be subjected to a shading compensation performed using a sample with a constant overall reflectivity in advance.

The light emission performed by the semiconductor lasers 22 is not limited to one-by-one sequential light emission from the semiconductor laser 22A to the semiconductor laser 22B, and the plural semiconductor lasers 22 may emit light in other methods in accordance with the necessary resolution or the like. For example, the plural semiconductor lasers 22 may sequentially emit light with some of the semiconductor lasers 22 disabled. That is, some of the plural semiconductor lasers 22 may be not used.

In short, it is only necessary that the semiconductor lasers 22 should emit light at least such that some of the plural semiconductor lasers 22 and others of the semiconductor lasers 22 emit light at different timings.

As shown in FIGS. 3A and 3B, an optical element 24 may be used to increase or decrease the interval between the rays of the parallel light from the semiconductor lasers 22 while maintaining the light as parallel light. This allows the interval between the rays of the parallel light to be adapted to the necessary resolution. Examples of the optical element 24 include a double-sided telecentric lens.

As shown in FIG. 3C, the double-sided telecentric lens includes a pair of lenses 24A and a diaphragm 24B disposed between the pair of lenses 24A. Reducing the size of the diaphragm 24B allows only parallel-light components to be taken in, but reduces the amount of light. Thus, the size of the diaphragm 24B is set in accordance with the necessary accuracy (the degree to which non-parallel-light components may be permitted) and the necessary amount of light. In the case where the semiconductor lasers 22 are disposed in one row, the double-sided telecentric lens may be shaped by removing portions that are not necessary for an optical path, that is, formed in a plate shape by leaving only a portion that is necessary for an optical path, as shown in FIG. 3D.

(Object B)

As shown in FIG. 1A, the object B, which is the target of irradiation with parallel light by the light emitting element 20, has portions P with a different reflectivity (hereinafter referred to as "different portions"). In the exemplary embodiment, the different portions P have a reflectivity higher than that of portions of the object B other than the different portions P.

The term "reflectivity" refers to the rate at which the parallel light from the light emitting element 20 is reflected (guided) to the light receiving element 30. The reflectivity is varied in accordance with the difference in material, gloss, etc. of the different portions P and the difference in angle of reflection on the reflective surface (surface) of the different portions P, for example.

The object B has edges (boundaries) E (E1, E2, E3, E4). The edges E include a first orthogonal-direction end (left end in FIG. 1A) E1, a second orthogonal-direction end (right end in FIG. 1A) E2, an upstream passage-direction end E3, and a downstream passage-direction end E4.

The different portions P each have edges (boundaries) F (F1, F2, F3, F4). The edges F include a first orthogonal-direction end (left end in FIG. 1A) F1, a second orthogonal-direction end (right end in FIG. 1A) F2, an upstream passage-direction end F3, and a downstream passage-direction end F4.

Figure 4A:
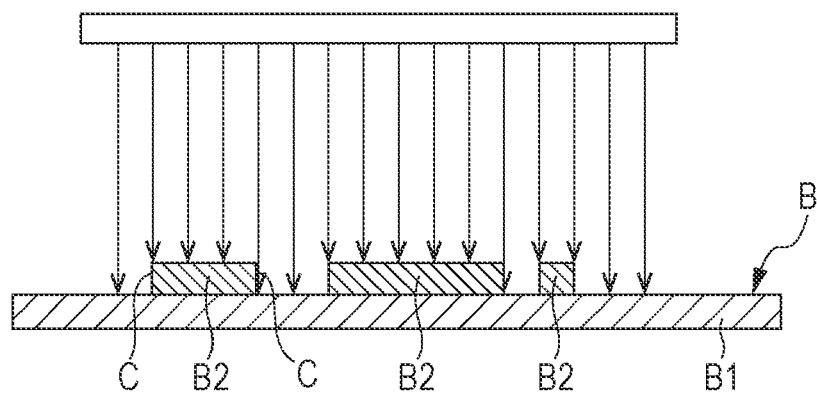
FIGS. 4A and 4B show a case where the target to be detected is an object formed by placing a second object on a first object.
Figure 4B:
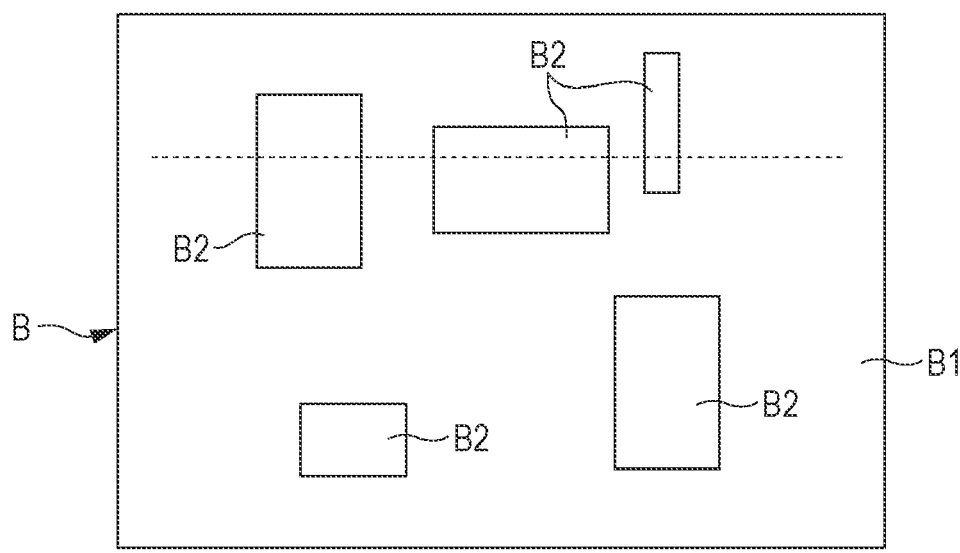

As shown in FIGS. 4A and 4B, the object B may be formed by placing on a first object B1 second objects B2 having a reflectivity different from that of the first object B1. In this case, the second objects B2 serve as the different portions P discussed earlier. In FIG. 4B, the position at which the light emitting element 20 (semiconductor lasers 22) is disposed is indicated by the broken line (the same applies to FIG. 6 to be discussed later).

The object B may be an object conveyed by a conveyance member, or may be an object that flies in the air. Even if the object B is a flying object, the edges E of the object B are detectable as long as there is a difference in reflectivity from the background. The flying direction may be oblique with respect to the direction (orthogonal direction) in which the semiconductor lasers 22 are disposed.

(Light Receiving Element 30)

As shown in FIG. 1C, the light receiving element 30 is formed by an element that receives parallel light reflected by the object B. Specific examples of the light receiving element 30 include a photodiode (PD). The photodiode outputs an electrical signal corresponding to the amount of the received light. Specifically, the photodiode outputs a larger value (current value or voltage value) as the amount of the received light becomes larger.

The light receiving element 30 is disposed above the passage region R for the object B. That is, the light receiving element 30 is disposed on the side to which the parallel light emitted from the light emitting element 20 is reflected, that is, the side on which the light emitting element 20 is disposed with respect to the passage region R. The light receiving element 30 is disposed upstream of the light emitting element 20 in the passage direction. The light receiving element 30 may be disposed downstream of the light emitting element 20 in the passage direction.

Plural light receiving elements 30 are provided, and the number of the light receiving elements 30 is less than the number of the semiconductor lasers 22. In the exemplary embodiment, the semiconductor lasers 22 emit light one by one, and it is possible to know which of the semiconductor lasers 22 the parallel light being received comes from. Therefore, it is not necessary to provide a light receiving element 30 for each of the semiconductor lasers 22, which enables the number of the light receiving elements 30 to be less than the number of the semiconductor lasers 22. Thus, there may be only one light receiving element 30.

The light receiving elements 30 are disposed along a line extending from a first end portion to a second end portion of the light emitting element 20 in the longitudinal direction (X direction). That is, the light receiving elements 30 are disposed upstream, in the passage direction, of the first end portion (leftmost semiconductor laser 22A) and the second end portion (rightmost semiconductor laser 22B) of the light emitting elements 20 in the longitudinal direction.

A lens 32 that condenses the reflected light is disposed on the side of the light receiving elements 30 on which the reflected light is incident. This secures the amount of light received by the light receiving elements 30. Examples of the lens 32 include a cylindrical lens provided in common to the plural light receiving elements 30. The lens that condenses the reflected light may be provided for each of the light receiving elements 30. The lens that condenses the reflected light may be dispensed with.

In the case where the plural light receiving elements 30 are used as in the exemplary embodiment, it is desirable that the semiconductor lasers 22 and the light receiving elements 30 should be correlated with each other in advance. That is, it is desirable to set in advance which of the light receiving elements 30 outputs a value to be referenced when each of the semiconductor lasers 22 emits light. This increases the processing speed compared to a case where one of values output from the plural light receiving elements 30 is selected. In correlating the semiconductor lasers 22 and the light receiving elements 30 with each other, plural semiconductor lasers 22 may be correlated with one light receiving element 30, for example.

One semiconductor laser 22 may be correlated with plural light receiving elements 30. In this case, the maximum value may be selected from the values output from the plural light receiving elements 30 to reference the maximum value.

In order to compensate for variations in amount of light received by the light receiving elements 30, it is desirable that each of the light receiving elements 30 should be subjected to a shading compensation performed using a sample with a constant overall reflectivity in advance. The plural light receiving elements 30 may receive light with some of the light receiving elements 30 disabled. That is, some of the plural light receiving elements 30 may be not used.

(Detection Section 40)

Figure 5:
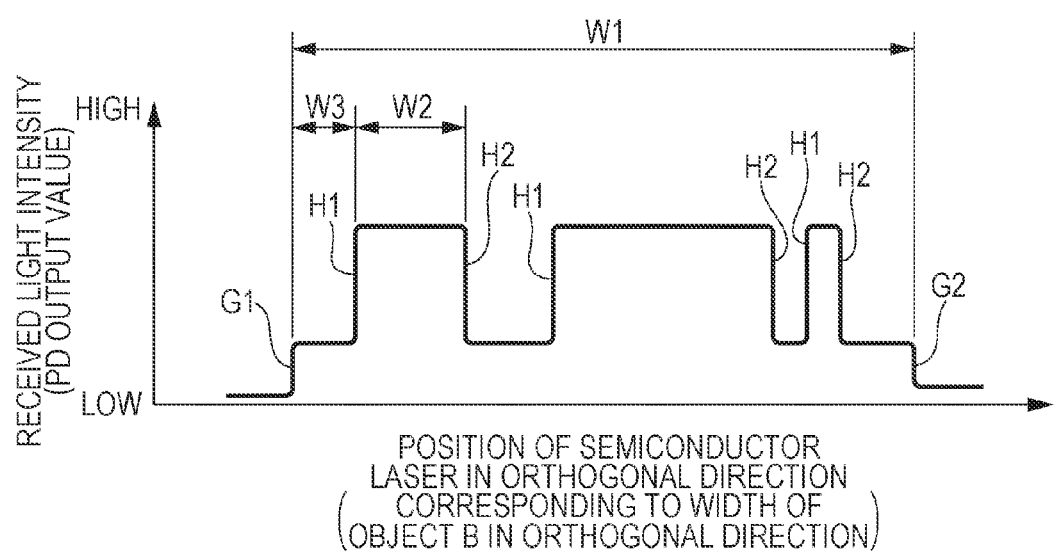
FIG. 5 shows the distribution of the received light intensity of parallel light received by a light receiving element according to the first exemplary embodiment.

FIG. 5 shows the distribution of the received light intensity of parallel light received by the light receiving element 30 when sequential light emission from the leftmost semiconductor laser 22A to the rightmost semiconductor laser 22B in FIG. 1A to the object B is performed once. The distribution of the received light intensity includes variation points G (G1, G2) and variation points H (H1, H2) at which the received light intensity is varied.

The detection section 40 detects at least one of the edges (boundaries) F of the different portions P of the object B and the edges (boundaries) E of the object B itself in accordance with the intensity distribution of the parallel light received by the light receiving element 30 (that is, the distribution of the received light intensity shown in FIG. 5).

Specifically, the detection section 40 detects at least one of the edges F of the different portions P of the object B and the edges E of the object B on the basis of the variation points G (G1, G2) and the variation points H (H1, H2) in the distribution of the received light intensity.

In the example shown in FIG. 5, the variation points G (G1, G2) in the distribution of the received light intensity correspond to the edges E of the object B, and the detection section 40 detects the presence or absence of the edges E of the object B, that is, the presence or absence of the object B itself, in accordance with the presence or absence of the variation points G. That is, the absence of the object B is detected in the case where no variation points G are present.

Meanwhile, the variation points H (H1, H2) in the distribution of the received light intensity correspond to the edges F of the different portions P, and the detection section 40 detects the presence or absence of the edges F of the different portions P, that is, the presence or absence of the different portions P themselves, in accordance with the presence or absence of the variation points H. That is, the absence of the different portions P is detected in the case where no variation points H are present.

The edges F and the edges E correspond to edges in the passage direction Y and the orthogonal direction X, and do not include edges of the object B in the height direction. That is, in the exemplary embodiment, the edges of the object B in the height direction are not referenced, and the detection section 40 does not have a function of detecting the height of the object B or the three-dimensional shape of the object B based on the height of the object B.

In accordance with whether the object B is present or absent detected by the detection section 40, it is inspected whether or not a component to be placed on a target article (an example of the object B) is placed on the target article, whether or not a lead of an electronic component (an example of the object B) is present (undamaged), or the like, for example.

In accordance with whether the different portions P are present or absent detected by the detection section 40, it is inspected whether or not a label to be affixed to a commercial article as the object B (a label having a reflectivity different from that of the commercial article) is affixed to the commercial article, for example.

In the example shown in FIG. 5, the variation point G1 corresponds to the first orthogonal-direction end E1 of the object B, and the variation point G2 corresponds to the second orthogonal-direction end E2 of the object B. The detection section 40 detects the distance from the first orthogonal-direction end E1 of the object B to the second orthogonal-direction end E2 of the object B, that is, a width W1 of the object B in the orthogonal direction, from the distance between the variation point G1 and the variation point G2.

In the example shown in FIG. 5, the variation point H1 corresponds to the first orthogonal-direction end F1 of the different portion P, and the variation point H2 corresponds to the second orthogonal-direction end F2 of the different portion P. The detection section 40 detects the distance from the first orthogonal-direction end F1 of the different portion P to the second orthogonal-direction end F2 of the different portion P, that is, a width W2 of the different portion P in the orthogonal direction, from the distance between the variation point H1 and the variation point H2.

The detection section 40 detects a width W3 from the first orthogonal-direction end E1 of the object B to the first orthogonal-direction end F1 of the different portion P from the distance between the variation point G1 and the variation point H1. In accordance with the width W3, the relative position of the different portion P with respect to the object B in the orthogonal direction is detected, for example. A comparison is made between the relative position and a reference position set in advance to detect any misregistration. The relative position of the different portion P with respect to the object B in the orthogonal direction may be detected with reference to the variation point G1 and the variation point H2, the variation point G2 and the variation point H1, or the variation point G2 and the variation point H2.

In the example shown in FIG. 5, the timing of appearance of the variation point G1 corresponds to the timing at which the upstream passage-direction end E3 of the object B passes over the light emitting element 20 (semiconductor laser 22). In addition, the timing of disappearance of the variation point G1 during repeated sequential light emission from the semiconductor laser 22A to the semiconductor laser 22B corresponds to the timing at which the downstream passage-direction end E4 of the object B passes over the light emitting element 20 (semiconductor laser 22). From the time since the appearance of the variation point G1 until the disappearance of the variation point G1, the detection section 40 detects the time over which a portion from the upstream passage-direction end E3 of the object B to the downstream passage-direction end E4 of the object B passes over the light emitting element 20 (semiconductor laser 22). A length L1 of the portion from the upstream passage-direction end E3 of the object B to the downstream passage-direction end E4 of the object B is detected in accordance with the passage time and the passage speed (travel speed) of the object B. Then, the two-dimensional shape (contour) of the object B is detected in accordance with the length L1 and the width W1 of the object B in the orthogonal direction discussed earlier.

In the example shown in FIG. 5, the timing of appearance of the variation point H1 corresponds to the timing at which the upstream passage-direction end F3 of the different portion P passes over the light emitting element 20 (semiconductor laser 22). In addition, the timing of disappearance of the variation point H1 during repeated sequential light emission from the semiconductor laser 22A to the semiconductor laser 22B corresponds to the timing at which the downstream passage-direction end F4 of the different portion P passes over the light emitting element 20 (semiconductor laser 22). From the time since the appearance of the variation point H1 until the disappearance of the variation point H1, the detection section 40 detects the time over which a portion from the upstream passage-direction end F3 of the different portion P to the downstream passage-direction end F4 of the different portion P passes over the light emitting element 20 (semiconductor laser 22). A length L2 of the portion from the upstream passage-direction end F3 of the different portion P to the downstream passage-direction end F4 of the different portion P is detected in accordance with the passage time and the passage speed (travel speed) of the object B. Then, the two-dimensional shape (contour) of the different portion P is detected in accordance with the length L2 and the width W2 of the different portion P in the orthogonal direction discussed earlier.

From the time since the appearance of the variation point G1 until the appearance of the variation point H1, the detection section 40 detects the time over which a portion from the upstream passage-direction end E3 of the object B to the upstream passage-direction end F3 of the different portion P passes over the light receiving element 30. A length L3 of the portion from the upstream passage-direction end E3 of the object B to the upstream passage-direction end F3 of the different portion P is detected in accordance with the passage time and the passage speed (travel speed) of the object B. From the length L3, the relative position of the different portion P with respect to the object B in the passage direction is detected, for example. A comparison is made between the relative position and a reference position set in advance to detect any misregistration.

The speed of the object B is measured as follows, for example.

Figure 6:
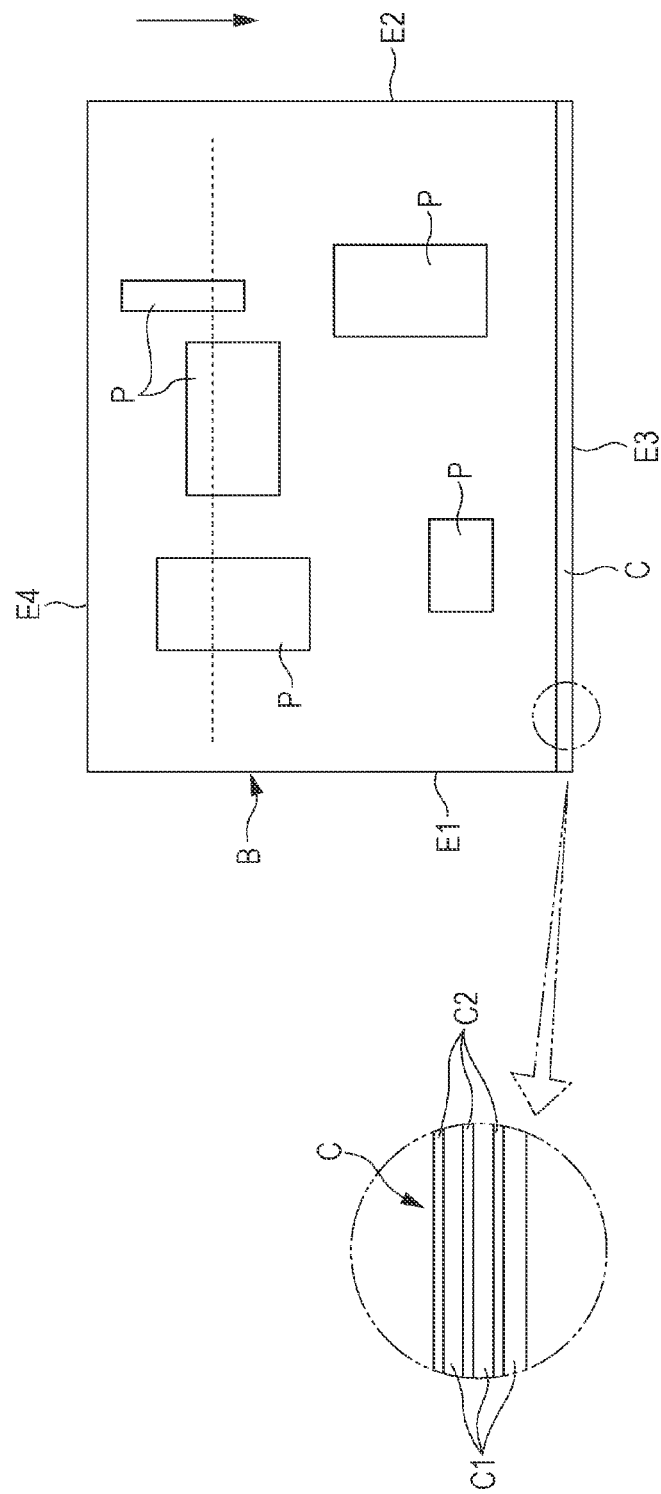
FIG. 6 is a plan view showing a configuration for detecting the speed of an object according to the first exemplary embodiment.

As shown in FIG. 6, a barcode C including plural regions C1 and C2 with different reflectivities is provided in advance at the upstream passage-direction end E3 of the object B to allow detection of the travel time of the regions C1 and C2 of the barcode C in the same manner as the different portion P discussed earlier. Then, the speed of the object B may be measured from the travel time and the length of the regions C1 and C2 in the passage direction known in advance. That is, a region with a known length in the passage direction is provided to the object B in advance and the detection section 40 detects the travel time of the region so that the speed of the object B is measured from the travel time and the length in the passage direction known in advance.

The speed of the object B may be the conveyance speed of a conveyance member (such as a conveyor) that conveys the object B set in advance, or a speed detected using a configuration according to a second exemplary embodiment to be discussed later, for example.

In the case where the object B is paper, for example, and the length L1 of the object B is known, the speed of the object B may be measured in accordance with the length L1 and the time over which a portion from the upstream passage-direction end E3 of the object B to the downstream passage-direction end E4 of the object B passes over the light emitting element 20 (semiconductor laser 22).

In accordance with the detected two-dimensional shape of the object B discussed earlier, it is inspected whether or not a component (an example of the object) is undamaged or whether or not the length of a component (an example of the object) is adequate, for example. In accordance with the detected two-dimensional shape of the different portion P discussed earlier, it is inspected whether or not the pattern or shape of an image formed on a recording medium is correct (an example of the different portion P), for example. Examples of the image include a barcode and a two-dimensional code.

Figure 7:
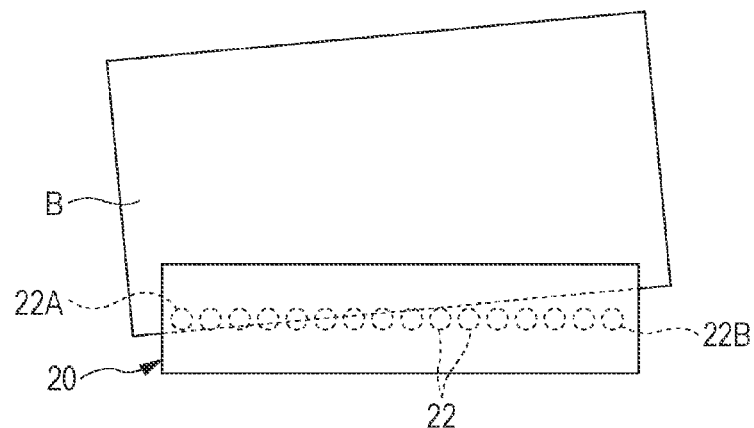
FIG. 7 is a plan view illustrating detection of inclination of an object according to the first exemplary embodiment.

In the configuration according to the first exemplary embodiment, as shown in FIG. 7, the inclination (skew) of the object B with respect to the orthogonal direction X is detectable. The inclination of the object B is detected by detecting the inclination of the upstream passage-direction end E3 of the object B, for example. The detection section 40 detects whether or not the upstream passage-direction end E3 of the object B is inclined in accordance with whether or not parallel light is received only from some of the plural semiconductor lasers 22 on the side of the first end in the orthogonal direction. In the case where parallel light is received from all of the plural semiconductor lasers 22, it is detected that the upstream passage-direction end E3 of the object B is not inclined.

As described above, the detection section 40 detects at least one of the two-dimensional shape of the object B, the length L1 of the object B in the passage direction, the width W1 of the object B in the orthogonal direction which is orthogonal to the passage direction, the inclination of the object B with respect to the orthogonal direction X, the two-dimensional shape of the different portion P, the length L2 of the different portion P in the passage direction, the width W2 of the different portion P in the orthogonal direction, the position of the different portion P with respect to the object B, and any misregistration in such position.

(First Modification)

Figure 8:
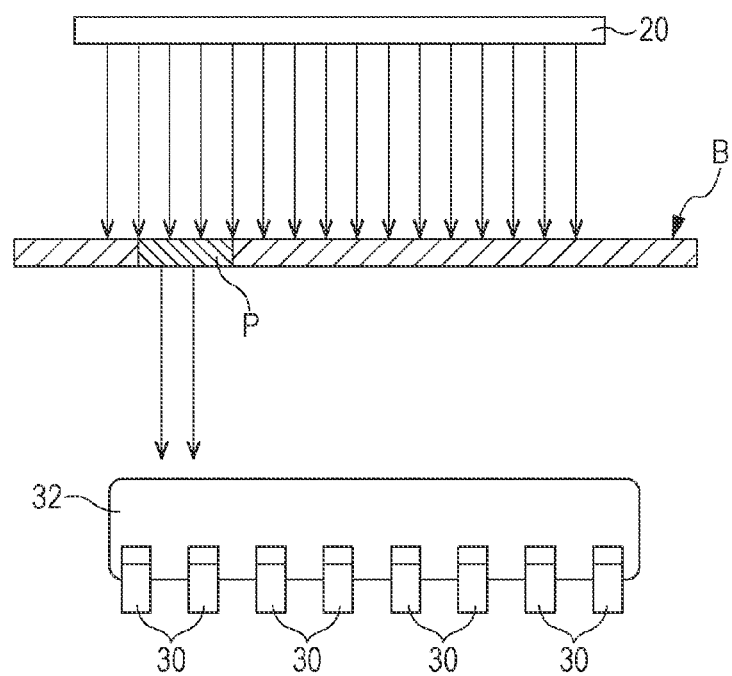
FIG. 8 is a front view showing a configuration for receiving parallel light having transmitted an object.

In the exemplary embodiment described above, the light receiving elements 30 receive reflected light. However, as shown in FIG. 8, the light receiving elements 30 may receive parallel light having transmitted the object B. In this case, the light receiving elements 30 are disposed on the side reached by the parallel light emitted from the light emitting element 20 and having transmitted the object B, that is, the side opposite to the side on which the light emitting element 20 is disposed with respect to the passage region R. In the case where the light emitting element 20 is disposed above the passage region R, the light receiving elements 30 are disposed below the passage region R.

In the configuration according to the first modification, the detection section 40 detects at least one of the edges (boundaries) F of portions P of the object B with different transmittances and the edges (boundaries) E of the object B in accordance with the intensity distribution of the parallel light received by the light receiving element 30. That is, this configuration allows detection of the portions P of the object B with different transmittances, rather than portions P of the object B with different reflectivities.

(Second Modification)

The semiconductor lasers 22 of the light emitting element 20 may emit light at plural different intensities. Specifically, sequential light emission from the semiconductor laser 22A to the semiconductor laser 22B is performed plural times at different light emitting intensities. One of the semiconductor lasers 22 may be caused to emit light plural times at different light emitting intensities, such plural light emissions may be repeated for each of the semiconductor lasers 22.

Portions of the object B other than the different portions P and the different portions P are different in reflectivity from each other, and the light emitting intensity suitable for detection for the different portions P and the light emitting intensity suitable for detection for the portions of the object B other than the different portions P are different from each other. In particular, in the case where there is a great difference in gloss between the portions of the object B other than the different portions P and the different portions P, there is a great difference between the light emitting intensity suitable for detection for the portions of the object B other than the different portions P and the light emitting intensity suitable for detection for the different portions P.

The light emitting intensity of the semiconductor lasers 22 may be set by measuring in advance the light emitting intensity suitable for detection for the different portions P and the light emitting intensity suitable for detection for the portions of the object B other than the different portions P.

The modification is also applicable to a case where the object B has plural different portions P with different reflectivities.

(Third Modification)

Figure 9G:
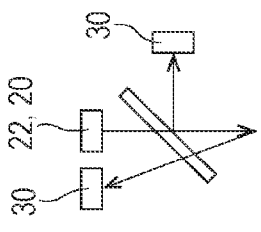
FIGS. 9A to 9H are each a schematic view showing a light emitting element and a light receiving element according to a modification.
Figure 9H:
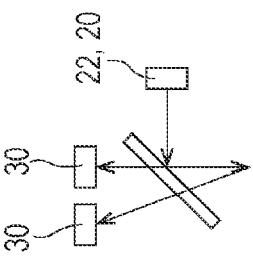
Figure 9E:
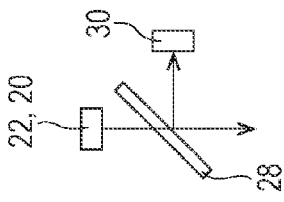
Figure 9F:
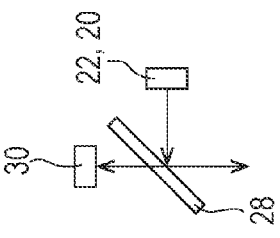

In the exemplary embodiment described above, as shown in FIG. 9A, the semiconductor laser 22 emits parallel light downward. However, the irradiation angle (light emission angle) at which the semiconductor laser 22 irradiates the object B with parallel light is set in accordance with the reflection characteristics of the object B. Similarly, the light receiving angle at which the light receiving element 30 receives light reflected from the object B is also set in accordance with the reflection characteristics of the object B.

Figure 9C:
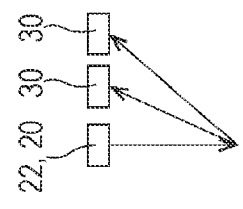
Figure 9D:
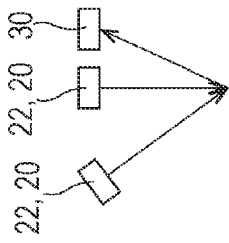
Figure 9A:
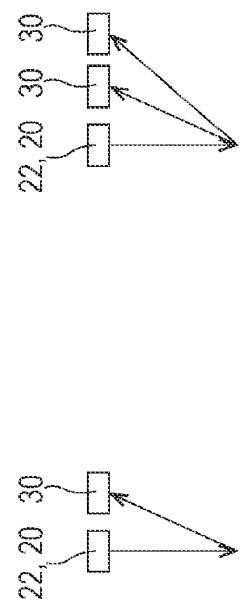
Figure 9B:
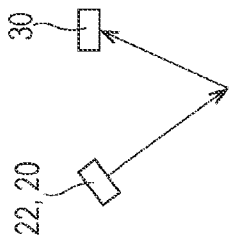

Specifically, as shown in FIG. 9B, the angle of incidence from the semiconductor laser 22 on the object B and the angle of reflection to the light receiving element 30 may be set so as to be equal to each other.

As shown in FIG. 9C, the detection apparatus 10 may include plural light receiving elements 30 that receive light at different angles emitted from the semiconductor laser 22 to the object B. As shown in FIG. 9D, the detection apparatus 10 may include plural light emitting elements 20 (semiconductor lasers 22) that emit light at different angles to the object B.

As shown in FIGS. 9E and 9F, a half mirror 28 may be disposed in an optical path for parallel light from the semiconductor laser 22 to receive light reflected toward the semiconductor laser 22. As shown in FIGS. 9G and 9H, a light receiving element 30 that receives light reflected from the object B at a different angle may be added to the configurations shown in FIGS. 9E and 9F.

(Other Modifications)

In the exemplary embodiment, the light emitting element 20 and the light receiving elements 30 are formed as separate components. However, the light emitting element 20 and the light receiving elements 30 may be formed on the same substrate.

In the exemplary embodiment, the detection apparatus 10 includes a single light emitting element 20. However, the light emitting section may be formed by plural light emitting elements 20.

Second Exemplary Embodiment

Next, a detection apparatus 200 according to a second exemplary embodiment will be described. FIGS. 10A to 10C are each a schematic view showing the detection apparatus according to the second exemplary embodiment. Here, components that are different from those according to the first exemplary embodiment will be described, and components that are the same in function as those according to the first exemplary embodiment are denoted by the same reference symbols to omit description thereof as appropriate.

In the first exemplary embodiment, the plural semiconductor lasers 22 are disposed in a row along the orthogonal direction X. In the second exemplary embodiment, as shown in FIGS. 10A and 10B, the plural semiconductor lasers 22 are disposed in a row along the passage direction Y in which the object B passes over the passage region R. Accordingly, the light receiving elements 30 are also disposed in a row along the passage direction Y.

Figure 11:
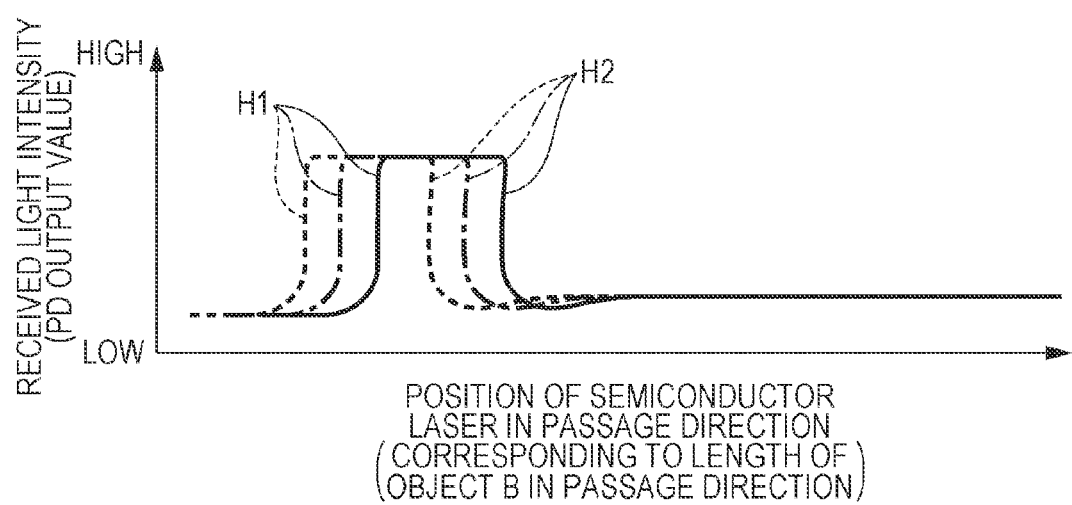
FIG. 11 shows the distribution of the received light intensity of parallel light received by a light receiving element according to the second exemplary embodiment.

FIG. 11 shows the distribution of the received light intensity of parallel light received by the light receiving element 30 when sequential light emission from the leftmost semiconductor laser 22A to the rightmost semiconductor laser 22B in FIG. 10A to the object B is performed three times, respectively indicated by a solid line, a dot-and-dash line, and a broken line. In FIG. 11, the distribution of the received light intensity caused by first sequential light emission from the start of detection is indicated by the solid line, the distribution of the received light intensity caused by second sequential light emission is indicated by the dot-and-dash line, and the distribution of the received light intensity caused by third sequential light emission is indicated by the broken line. The distribution of the received light intensity includes variation points H (H1, H2) at which the received light intensity is varied.

The detection section 40 detects the speed of the object B in accordance with the intensity distribution of parallel light received by the light receiving element 30 (that is, the distribution of the received light intensity shown in FIG. 11). Specifically, the detection section 40 detects the edges F of the different portions P of the object B on the basis of the variation points H (H1, H2) in the distribution of the received light intensity, and detects the speed of the object B on the basis of the edges F.

The variation point H2 in the distribution of the received light intensity corresponds to the upstream passage-direction end F3 of the different portion P, and the detection section 40 detects the travel distance of the object B during the time since the first sequential light emission until the second sequential light emission in accordance with the distance from the variation point H2 in the solid line to the variation point H2 in the dot-and-dash line.

Specifically, such time corresponds to the time since the timing at which the semiconductor laser 22 emits light to cause appearance of the variation point H2 in the first sequential light emission until the timing at which the semiconductor laser 22 emits light to cause appearance of the variation point H2 in the second sequential light emission. In referencing the variation point H, an output value corresponding to 50% or 100% of the peak of the output at the rise of the variation point H may be referenced.

Then, the detection section 40 detects the travel speed of the object B during such time from such time and the travel distance of the object B.

The detection section 40 detects the travel distance of the object B during the time since the second sequential light emission until the third sequential light emission in accordance with the distance from the variation point H2 in the dot-and-dash line until the variation point H2 in the broken line.

Specifically, such time corresponds to the time since the timing at which the semiconductor laser 22 emits light to cause appearance of the variation point H2 in the second sequential light emission until the timing at which the semiconductor laser 22 emits light to cause appearance of the variation point H2 in the third sequential light emission.

Then, the detection section 40 detects the travel speed of the object B during such time from such time and the travel distance of the object B. In the exemplary embodiment, the speed of the object B during the time since the first sequential light emission until the second sequential light emission and the speed of the object B during the time since the second sequential light emission until the third sequential light emission are detected in this way. Variations in speed of the object B, the average speed of the object B, etc. are calculated from the plural detected speeds of the object B.

The speed of the object B may be calculated from the time since the first sequential light emission until the third sequential light emission and the travel distance of the object B during such time.

For the light emitting element 20 having 1000 semiconductor lasers 22, as discussed earlier, one cycle of sequential light emission from the leftmost semiconductor laser 22A to the rightmost semiconductor laser 22B is 1 µs.

In the second exemplary embodiment in which the semiconductor lasers 22 sequentially emit light, the edges F of the different portion P are detected on the basis of variations in intensity of the parallel light emitted from one of the semiconductor lasers 22 caused in the individual range.

In the exemplary embodiment, the speed of the object B is detected using the variation point H2 corresponding to the upstream passage-direction end F3 of the different portion P. However, the speed of the object B may be detected using the variation point H1 corresponding to the downstream passage-direction end F4 of the different portion P, a variation point corresponding to the upstream passage-direction end E3 of the object B, or a variation point corresponding to the downstream passage-direction end E4 of the object B.

(First Modification)

Figure 12A:
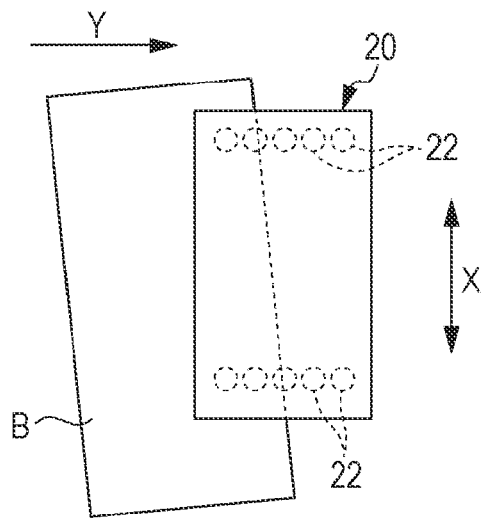
FIGS. 12A and 12B are each a schematic view showing a configuration according to a modification of the second exemplary embodiment.
Figure 12B:
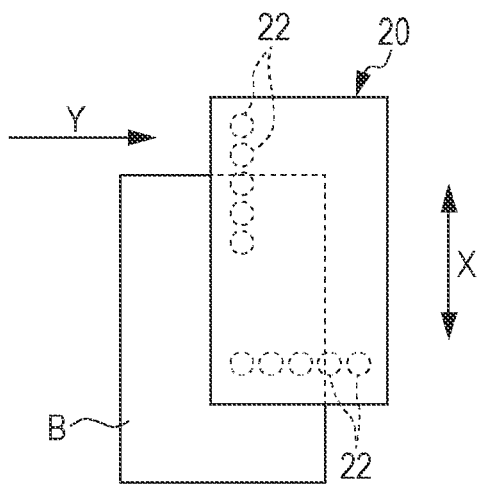

In the second exemplary embodiment described above, the plural semiconductor lasers 22 are disposed in one row along the passage direction Y. In a first modification, as shown in FIG. 12A, the plural semiconductor lasers 22 are disposed in a row along the passage direction Y in which the object B passes over the passage region R at each of a first end portion and a second end portion of the passage region R in the orthogonal direction X. This allows the inclination (skew) of the object B to be detected because of the difference between the position (timing) of the upstream passage-direction end E3 of the object B detected for the plural semiconductor lasers 22 disposed at the first end portion in the orthogonal direction X and the position (timing) of the upstream passage-direction end E3 of the object B detected for the plural semiconductor lasers 22 disposed at the second end portion in the orthogonal direction X.

(Second Modification)

In a second modification, the light emitting element 20 includes plural semiconductor lasers 22 disposed in a row along the passage direction Y, and plural semiconductor lasers 22 disposed in a row along the orthogonal direction X. This allows detection of any misregistration of the object B in the orthogonal direction X.

The present invention is not limited to the exemplary embodiments described above, and various modifications, changes, and improvements may be made. For example, the plural modifications described above may be combined with each other as appropriate. The plural modifications presented for the first exemplary embodiment may be combined with the second exemplary embodiment as appropriate. The plural modifications presented for the second exemplary embodiment may be combined with the first exemplary embodiment as appropriate.

What is claimed is:

1. A detection apparatus comprising:
a plurality of light emitting sections that are disposed in a row and that emit parallel light to a passage region, over which an object passes;
one or more light receiving sections that receive the parallel light reflected by or having transmitted through the object, a number of the light receiving sections being less than a number of the light emitting sections; and
a detection section that detects at least one of edges of the object and edges of a portion of the object with a different reflectivity or transmittance in accordance with an intensity distribution of the parallel light received by the light receiving sections, wherein the light emitting sections repeatedly sequentially emit each beam of the parallel light to the object at a predetermined interval of time when the object passes over the passage region.

2. The detection apparatus according to claim 1, wherein the plurality of light emitting sections are integrally formed on a common semiconductor substrate to form a light emitting element.

3. The detection apparatus according to claim 1, wherein the plurality of light emitting sections emit light to the object at a plurality of different light emitting intensities.

4. The detection apparatus according to claim 1, wherein the plurality of light emitting sections are disposed so as to intersect a passage direction in which the object passes, and sequentially emit light, and
the detection section detects at least one of a two-dimensional shape of the object, a length of the object in the passage direction, a width of the object in an orthogonal direction that is orthogonal to the passage direction, an inclination of the object with respect to the orthogonal direction, a two-dimensional shape of the portion, a length of the portion in the passage direction, a width of the portion in the orthogonal direction, a position of the portion with respect to the object, and any misregistration in the position on the basis of at least one of the edges of the object and the edges of the portion.

5. The detection apparatus according to claim 1, wherein the plurality of light emitting sections are disposed along a passage direction in which the object passes, and sequentially emit light, and
the detection section detects a speed of the object on the basis of at least one of the edges of the object and the edges of the portion.

6. The detection apparatus according to claim 1, wherein the one or more light receiving sections are configured to receive the parallel light reflected by the object.

7. The detection apparatus according to claim 1, wherein the detection section is configured to detect edges of a portion of the object that is within outer edges of the object.

8. The detection apparatus according to claim 1, wherein the plurality of light emitting sections is a plurality of semiconductor lasers having resonator structures.

9. The detection apparatus according to claim 8, wherein the plurality of semiconductor lasers comprise at least one of surface emitting lasers, vertical cavity surface emitting lasers, and edge emitting lasers.

10. The detection apparatus according to claim 1, wherein the one or more light receiving sections are configured to receive first light reflected by a first portion of the object and second light reflected by a second portion of the object, the first portion and the second portion have different reflectivities, and the detection section detects an edge between the first portion and the second portion in accordance with an intensity distribution of the first light and the second light.

11. The detection apparatus according to claim 1, wherein the one or more light receiving sections are configured to receive first light having transmitted a first portion of the object and second light having transmitted a second portion of the object, the first portion and the second portion have different transmittances, and the detection section detects an edge between the first portion and the second portion in accordance with an intensity distribution of the first light and the second light.

12. The detection apparatus according to claim 1, further comprising an optical element disposed between the light emitting sections and the object and that increases or decreases an interval between beams of the parallel light.

13. The detection apparatus according to claim 1, further comprising a double-sided telecentric lens disposed between the light emitting sections and the object.

14. The detection apparatus according to claim 1, wherein the one or more light receiving sections is only one light receiving section.

15. The detection apparatus according to claim 1, further comprising a condensing lens disposed between the one or more light receiving sections and the object and that condenses the parallel light reflected by the object.

16. The detection apparatus according to claim 1, wherein the light emitting sections repeatedly sequentially emit each beam of the parallel light to the object from a first light emitting section to a last light emitting section of the plurality of light emitting sections, such that the first light emitting section emits a beam of the parallel light to the object after the last light emitting section finishes emitting a beam of the parallel light to the object.

17. The detection apparatus according to claim 1, wherein the detection section detects the at least one of edges of the object and the edges of the portion of the object based on the repeated emitting of the parallel light.

18. The detection apparatus according to claim 1, wherein the detection section detects whether or not a label is affixed to the object.

19. The detection apparatus according to claim 1, wherein the detection section detects whether or not the object is undamaged.

20. The detection apparatus according to claim 1, wherein the detection section detects a pattern or shape of an image formed on a recording medium to inspect whether or not the pattern or the shape of the image is correct.

21. A detection apparatus comprising:
a plurality of light emitting sections that are disposed in a row and that emit parallel light to a passage region, over which an object passes;
one or more light receiving sections that receive first light reflected by a first portion of the object and second light reflected by a second portion of the object, the first portion and the second portion having different reflectivities; and
a detection section that detects an edge between the first portion and the second portion in accordance with an intensity distribution of the first light and the second light,
wherein the light emitting sections repeatedly sequentially emit each beam of the parallel light to the object at a predetermined interval of time when the object passes over the passage region.

22. The detection apparatus according to claim 21, wherein the detection section that detects the edge between the first portion and the second portion in accordance with the intensity distribution of the first light and the second light, and detects outer edges of the object in accordance with an intensity distribution of the parallel light received by the one or more light receiving sections.

23. A detection apparatus comprising:
a plurality of light emitting sections that are disposed in a row and that emit parallel light to a passage region, over which an object passes;
one or more light receiving sections that receive first light having transmitted a first portion of the object and second light having transmitted a second portion of the object, the first portion and the second portion having different transmittances; and a detection section that detects an edge between the first portion and the second portion in accordance with an intensity distribution of the first light and the second light, wherein the light emitting sections repeatedly sequentially emit each beam of the parallel light to the object at a predetermined interval of time when the object passes over the passage region.

* * * * *